United States Patent [19]
Hanai et al.

[11] 3,971,069
[45] July 20, 1976

[54] THERMAL PRINTING APPARATUS

[75] Inventors: Ichiro Hanai, Ichikawa; Toshiharu Kobayashi; Kazuo Takahashi, both of Tokyo, all of Japan

[73] Assignee: Sony Corporation, Tokyo, Japan

[22] Filed: Nov. 18, 1974

[21] Appl. No.: 524,957

[30] Foreign Application Priority Data
Nov. 27, 1973 Japan.............................. 48-133274

[52] U.S. Cl. ................................................ 360/16
[51] Int. Cl.² ......................................... G11B 5/86
[58] Field of Search ................. 360/16, 17; 219/388

[56] References Cited
UNITED STATES PATENTS
3,876,860  4/1975  Nomura et al......................... 360/16

Primary Examiner—Robert S. Tupper
Attorney, Agent, or Firm—Hill, Gross, Simpson, Van Santen, Steadman, Chiara & Simpson

[57] ABSTRACT

A thermal printing apparatus for transferring or thermally printing information recorded on a master magnetic tape to a slave magnetic tape which includes a device for detecting or measuring the temperature of the slave tape ahead of the thermal printing process and in which the transport speed of the slave tape and master tape is controlled to accurately control the temperature of the tape. The difference between the temperature of the slave tape ahead of the thermal printing and a reference temperature is utilized to control speed changes and thus achieve optimum thermal printing.

9 Claims, 2 Drawing Figures

THERMAL PRINTING APPARATUS

CROSS-REFERENCES TO RELATED APPLICATIONS

This invention is an improvement on the inventions disclosed in co-pending application Ser. No. 444,571, now U.S. Pat. No. 3,928,747, filed Feb. 21, 1974 entitled "Thermal Printing Apparatus" assigned to the assignee of the present application.

BACKGROUND OF THE INVENTION

1. Field of the Invention

The present invention relates generally to a thermal printing apparatus for transferring by thermal printing sound signals, video signals and so on recorded on a master magnetic tape to a slave magnetic tape, and more particularly is directed to a thermal printing apparatus which includes a device which measures temperature of the slave tape and controls the transport speed of the slave and master tapes to accurately control the temperature. The difference between the measured temperature of the slave tape and a reference temperature is used to control the transport speed and thus, achieve optimum thermal printing of signals on the slave tape from the master tape.

2. Description of the Prior Art

At present, a thermal printing method has been known for transferring signals recorded on a master magnetic tape to a slave magnetic tape. In the prior art method, a magnetic tape which uses chromium dioxide $CrO_2$ as a magnetic material is used as a slave magnetic tape. In this case, the Curie temperature of the chromium dioxide is about 130°C which is relatively low and the coercive force of the chromium dioxide greatly depends upon the temperature. The coercive force of the chromium dioxide is about 500 $O_e$ at room temperature, but decreases as the chromium dioxide is heated. When the chromium dioxide is heated to about 130°C, its coercive force becomes zero. When using a slave tape having the characteristics mentioned above, it is desirable to use a master tape with magnetic material having a higher Curie temperature than that of the slave tape and when the slave tape is heated to about 130°C, and thereafter is cooled so that information signals recorded on the master tape will be transferred to the slave tape.

In one of the embodiments of prior application, Ser. No. 444,571, when the temperature of the slave tape deviates from a reference temperature (about 130°C), a heating device such as a lamp is controlled in brightness as a function of the difference between the temperature of the slave tape and the reference temperature so as to make the temperature difference substantially zero. However, this requires a long interval of time and thus the speed of response is slow and hence the thermal printing temperature cannot be accurately maintained.

SUMMARY OF THE INVENTION

It is an object of the present invention to provide a thermal printing apparatus free from the defects of the prior art.

It is another object of the invention to provide a thermal printing apparatus which can maintain the temperature of a slave tape substantially constant during the thermal printing process.

It is a further object of the invention to provide a thermal printing apparatus which can achieve superior thermal printing.

According to the present invention, there is provided a thermal printing apparatus which comprises means for supplying a master tape, means for supplying a slave tape, and means for heating said slave tape at a predetermined temperature. Also, provided are means for measuring temperature of the slave tape ahead of the thermal printing process, means for producing an electrical signal as a function of the difference between the temperature of said slave tape and a reference temperature, and means for superimposing the master and slave tapes and for transporting said tapes. The superimposing and transporting means are controlled by the electrical signal to maintain the temperature of the slave tape substantially at a predetermined temperature during the thermal printing process.

The other objects, features and advantages of the present invention will become apparent from the following description taken in conjunction with the accompanying drawings.

DESCRIPTION OF THE PREFERRED EMBODIMENT

An embodiment of the thermal printing apparatus according to the present invention will be hereinafter described with reference to FIG. 1.

Figure 1:
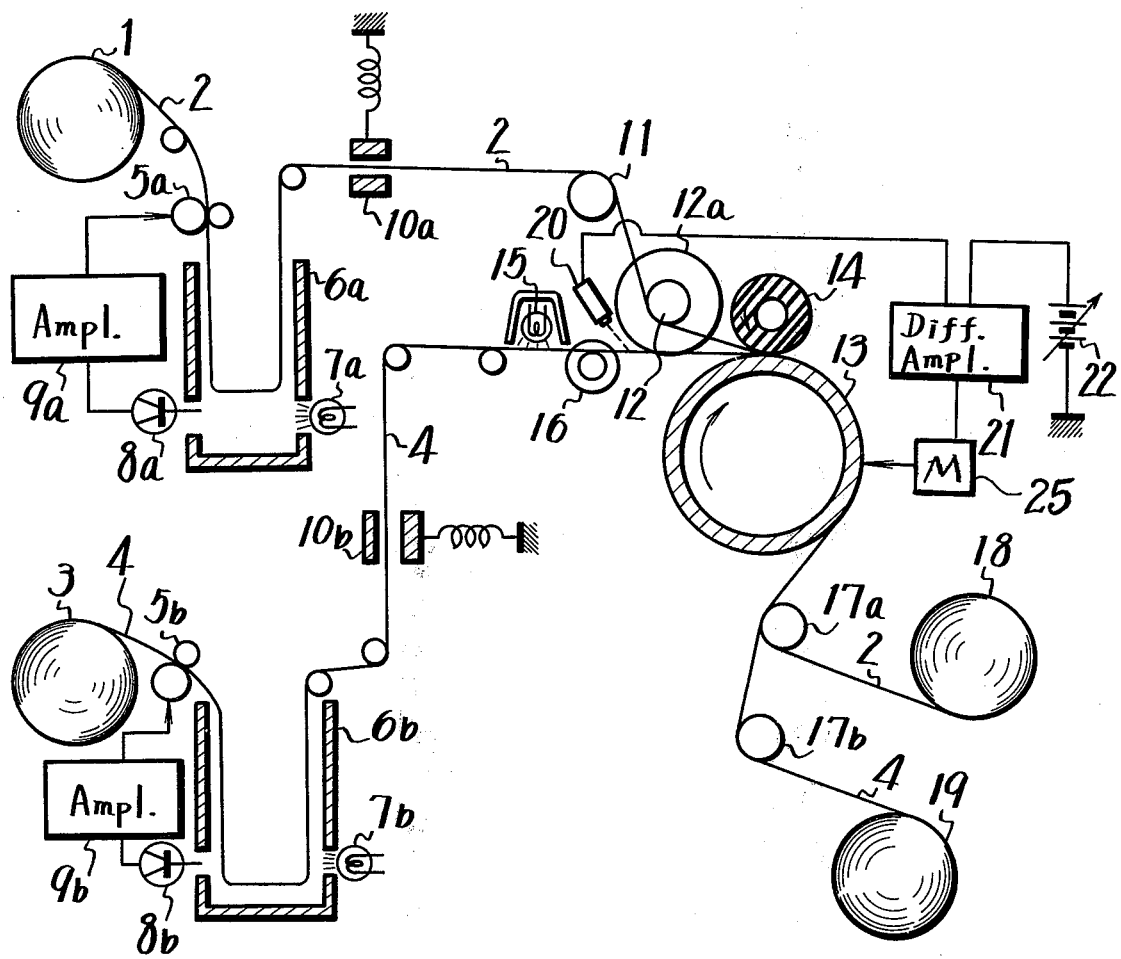
FIG. 1 is a schematic diagram showing an embodiment of the thermal printing apparatus according to the present invention.

In FIG. 1, a supply reel 1 carries a magnetic master tape 2 having information signals recorded thereon, and 3 a supply reel carries a magnetic slave tape which has no information recorded thereon. The master tape 2 and slave tape 4 are transported by capstans 5a and 5b respectively, which are similarly constructed. The master and slave tapes move from the supply reels 1 and 2 to cases or receivers 6a and 6b in which the master and slave tapes 2 and 4 are temporarily retained. In receiver 6a a light emission element such as a lamp 7a and a photoconductive element such as a phototransistor 8a are provided on opposing side walls of the tape case 6a near the bottom. A lamp 7b and a phototransistor 8b are mounted adjacent openings on the bottom of case 6b. When the master and slave tapes 2 and 4 prevent the passage of lights from the lamps 7a and 7b to the phototransistors 8a and 8b, respectively, the rotational speed of the capstans 5a and 5b is controlled so as to lower the supply speed of the master and slave tapes 2 and 4, respectively. When the master and slave tapes 2 and 4 do not prevent the passage of lights from the lamps 7a and 7b to the phototransistors 8a and 8b, the capstans 5a and 5b are driven faster to increase the speed of the master and slave tapes 2 and 4 into cases 6a and 6b. Thus, the speed of supplying tapes 2 and 4 from the supply reels 1 and 3 to the cases 6a and 6b is accurately controlled. Amplifiers 9a, 9b are respectively connected between the phototransistors 8a, 8b and the drive motors for the capstans 5a, 5b. Thus, the master and slave tapes 2 and 4 are maintained tension free between the supply reels 1, 3 and constant tension pads 10a, 10b, respectively which are mounted as shown. The master and slave tapes 2 and 4 move through the constant tension pads 10a and 10b, respectively. After master tape 2 passes through the constant tension pad 10a it is guided around guides 11 and 12 and then supplied into the clearance between a cooling drum 13 and a pressure drum 14. The cooling drum 13 is rotated by a DC motor 25. Drum 13 is formed of material having good heat conductivity. For example, a hollow metal drum can be used which is supplied with, for example, cooling air. It is preferred that the pressure drum 14 be made of resilient material such as rubber at least on its outer periphery to increase the contact area thereof with the cooling drum 13 while gripping the master and slave tapes 2 and 4 therebetween. The cooling drum 13 and pressure drum 14 both freely rotate about their center axes.

The slave tape 4 passes through the constant tension pad 10b and is guided pass a heating device 15 located behind the constant tension pad 10b but ahead of the drum 13 along the transport path of the slave tape 4. From heating device 15 the tape moves around a guide 16 and then into the clearance between the cooling drum 13 and the pressure drum 14. The heating device 15 may comprise any conventional heating means such as a lamp, a heat shoe, a heater, hot air or the like. The heating device 15 heats the slave tape 4 to a temperature of about 130°C. The slave and master tapes 4 and 2 are so guided by the guides 16 and 12 that they are correctly superimposed but spaced apart until they arrive in the clearance between the cooling drum 13 and the urging drum 14. The purpose of this is to prevent the heated slave tape from heating the master tape. For example, a flange 12a is formed under the guide 12 to separate the lower edges of the master and slave tapes 2 and 4. It is desirable in order to prevent the temperature of the slave tape 4 from being lowered as it contacts the guide 16, that the guide 16 be made of material having small heat capacity. The guide 16 may also be located at a position where it can be heated by the heating device 15 or it could also be independently heated.

The slave tape 4 is urged against the master tape 2 between the cooling drum 13 and the pressure drum 14. The slave tape 4 is positioned so that it contacts the cooling drum 13. A guide 17a is provided at a position to guide the master and slave tapes 2 and 4 after they have been transported around the cooling drum 13. The tapes 2 and 4 follow the periphery of drum 13 about 180°. The master tape 2 is taken up by a take-up reel 18 after it passes the guide 17a and the slave tape 4 is taken up by a take-up reel 19 after it passes a guide 17 b.

In the present invention, in order to measure the surface temperature of the magnetic coating layer of the slave tape 4 just before the thermal printing is accomplished from the master tape 2 to the slave tape 4 during the contact of the cooling drum 13 with the pressure drum 14, a surface thermometer 20 such as an infrared ray thermometer is mounted as shown in FIG. 1 and detects the temperature as the slave tape just before printing occurs. The surface thermometer 20 produces a voltage corresponding to the surface temperature of the slave tape 4 and applies the voltage to one input terminal of a differential amplifier 21 whose other input terminal is supplied with a reference voltage from a DC voltage source 22. The voltage from source 22 corresponds to a desired reference temperature (about 130°C for example). The differential amplifier 21 amplifies the difference voltage between the output of the surface thermometer 20 which corresponds with the surface temperature of the slave tape 4 and the reference voltage from the voltage source 22, and supplies the amplified difference voltage to an adder 41 which receives a standard voltage from terminal 41. The sum of the standard voltage from terminal 40 and the output voltage of differential amplifier are supplied to the DC motor 25 which drives the cooling drum 13. Thus, the speed of DC motor 25 is controlled which in turn controls the rotational speed of the cooling drum 13. This, of course, controls the transport speed of the slave tape 4. Thus, when the surface temperature of the slave tape 4 is higher than the reference temperature, the rotational speed of the DC motor 25 for driving the cooling drum 13 is increased by the voltage from differential amplifier 21 to thus increase the tape transportation speed. When the surface temperature of the slave tape 4 is lower than the reference temperature, the DC motor 25 is supplied a voltage which decreases its rotational speed and thus lowers the tape transportation speed.

With the present invention described as above, the slave tape 4 is heated by the heating device 15 to a temperature higher than the reference temperature. The surface temperature of the slave tape 4 is measured by the surface thermometer 20 and the voltage from the surface thermometer 20 which corresponds to the measured temperature of the slave tape 4 is applied to the differential amplifier 21 and compared with the reference voltage. A voltage corresponding to an increased temperature of the slave tape 4 is applied to the DC motor 25 for driving the cooling drum 13 faster. Thus, the transportation speed of the slave tape 4 is increased which decreases the interval of time that the slave tape 4 is adjacent the heating device 15 and hence the surface temperature of the slave tape 4 will be lowered to the desired temperature for the thermal printing process.

When the surface temperature of the slave tape 4 is lower than the reference temperature, a voltage which corresponds with the difference between the lower temperature of the slave tape 4 and the reference temperature is applied by differential amplifier 21 to the DC motor 25 which will drive the cooling drum 13 slower and thus decrease the transport speed of the slave tape 4. Thus, the period of heating the slave tape 4 by the heating device 15 is increased and the surface temperature of the slave tape 4 will be increased to the desired temperature for the thermal printing process.

Thus, according to the present invention, the fluctuations of the surface temperature of the slave tape is measured or detected, and the transport speed of the slave tape is controlled in response to the detected temperature so as to control the temperature of the slave tape by the heating device, and the temperature of the slave tape will be kept constant during the thermal printing process which results in approved thermal printing.

Since the transport speed of the slave tape is controlled in accordance with the difference between the reference temperature and the temperature of the slave tape in the present invention, the speed of response to temperature changes is much higher than in systems where the temperature of a heating device such as a lamp is adjusted in response to temperature differences. Thus, in the present invention thermal printing can be achieved more effectively.

In the above mentioned embodiment of the present invention, the rotational speed of the cooling drum 13 is controlled so as to control the transport speed of the slave tape 4, but it could be that the master tape 2 and the slave tape 4 could be taken up by the take-up reels 18 and 19 through the guides 17a and 17b and further through drive capstans and pinch rollers and wherein the capstan motor for these capstans could be controlled.

Figure 2:
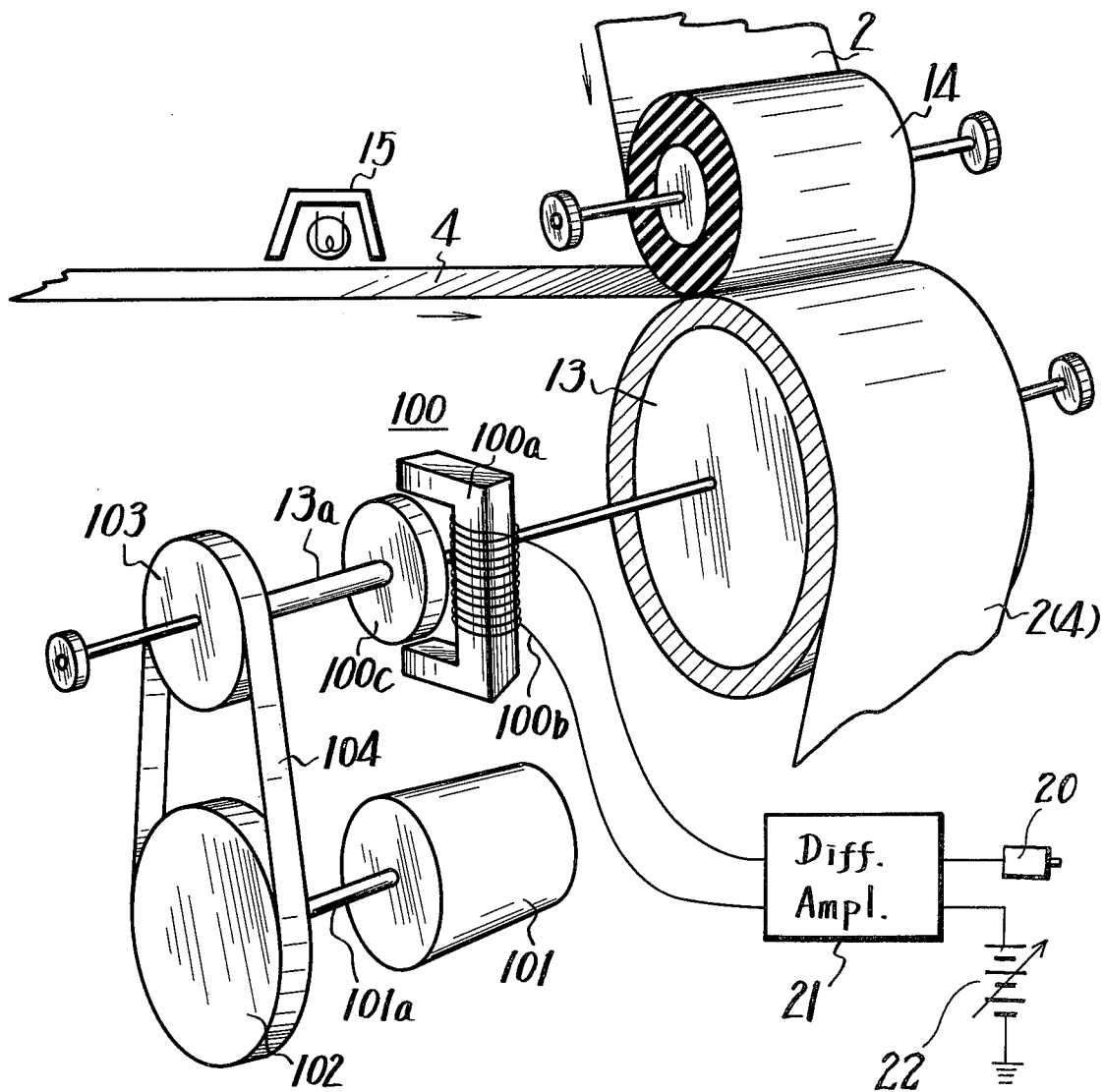
FIG. 2 is a perspective view, in enlarged scale, showing additional features of the present invention.

In FIG. 2 the same reference numerals indicate the same elements as those of FIG. 1.

As shown in FIG. 2 the rotary shaft 13a of the cooling drum 13 is provided with an electro magnetic braking device 100. The braking device 100 consists of a U-shaped magnetic yoke or body 100a on which a coil 100b is wound. A disc magnet 100c is fixed to shaft 13a within magnetic body 100a such that as coil 100b is energized braking occurs. The coil 100b is supplied with current by the differential amplifier 21. This current is proportional to the difference between the reference voltage source 22 and the voltage from the thermometer 20 corresponding to the surface temperature of the slave tape 4 and if the tape 4 is not hot enough a suitable braking force is applied to the rotary shaft 13a. The cooling drum 13 is rotated by the motor 101 which rotates at a constant speed through a pulley 102 which is attached to the rotary shaft 101a of the motor 101. A pulley 103 is attached to the rotary shaft 13a of the cooling drum 13 and a belt 104 couples the pulleys 102 and 103.

According to the embodiment of FIG. 2 the pulley 102 is rotated by the motor 101 at a constant speed, and the current in coil 100b of the electro magnetic braking device 100 which is supplied from the differential amplifier 21 determines the amount of slippage between the belt 104 and pulley 103 so that the speed of shaft 13a and drum 13 will be controlled and consequently the transport speed of tape 4 relative to the heating means 15 will be controlled. Variation in the amount of slippage as determined by the brake 100 can cause the drum 13 to either speed up or slow down. Thus, the same effect as that in the embodiment shown in FIG. 1 can be achieved and the surface temperature of the slave tape 4 can be maintained at the desired reference temperature.

It is apparent that many variations and modifications can be effected by one skilled in the art without departing from the spirits or scope of the novel concepts of the present invention.

We claim as our invention:

1. A thermal printing apparatus comprising:
    a slave tape;
    a master tape;
    means transporting the master tape;
    heating means mounted adjacent said slave tape for heating said tape above its Curie point before printing;
    means for bringing said slave tape into contact with said master tape and maintaining said tapes in contact until the slave tape cools substantially below its Curie temperature;
    a temperature detecting means mounted adjacent means for bringing said slave tape into contact with said master tape to detect the temperature of said slave tape;
    means for driving said slave tape relative to said heating means; and
    the output of said detecting means connected to said means for driving said slave tape to vary its speed and said drive means responsive to the output of said detecting means to maintain said slave tape at a desired temperature.

2. A thermal printing apparatus according to claim 1, including a tape reservoir mounted ahead of said heating means, second means for driving said slave tape into said tape reservoir, photoelectric detecting means mounted to detect the amount of tape in said tape reservoir, and said photoelectric detecting means connected to said second means for driving said slave tape.

3. A thermal printing apparatus comprising:
    a master tape;
    a slave tape;
    means for supplying a master tape on which information is magnetically recorded;
    means for supplying a slave tape;
    means for heating said slave tape to a predetermined temperature which is at least the Curie temperature before printing occurs;
    means for detecting the temperature of said slave tape after it has been heated by said heating means and before printing occurs;
    means for producing an electrical signal connected to said temperature detecting means and wherein said electrical signal is equal to the difference in temperature of said slave tape and a reference temperature;
    means for transporting and superimposing said master and slave tapes together and maintaining contact therebetween until the slave tape cools substantially below its Curie point temperature; and
    said superimposing and transporting means controlled by said electrical signal.

4. A thermal printing apparatus as claimed in claim 3, in which said tape transporting means includes a motor and the speed of said motor is varied by said electrical signal.

5. A thermal printing apparatus as claimed in claim 4, in which said tape superimposing and transporting means include a cooling drum and a pressure drum, and said cooling drum being rotated by said motor so as to transport said master and slave tapes in superimposed condition.

6. A thermal printing apparatus as claimed in claim 3, in which said tape transporting means includes a motor and an electro magnetic braking device and said electro magnetic braking device controlled by said electrical signal.

7. A thermal printing apparatus as claimed in claim 3, in which said master tape supplying means includes a tape guide which has a flange portion under it so as to keep said master and slave tapes separated from each other before the thermal printing is carried out so as to avoid the master tape being heated by the slave tape.

8. A thermal printing apparatus as claimed in claim 3 in which said temperature detecting device is a surface thermometer, a reference voltage source for producing a reference voltage signal proportional to a reference temperature, and a differential amplifier which is supplied with signals from said surface thermometer and said reference voltage source and producing a voltage signal proportional to the difference between the temperature of said slave tape and said reference temperature, a standard voltage source, adding means receiving the output of said differential amplifier and said standard voltage source and supplying an input to said transporting means.

9. A thermal printing apparatus comprising:
   a master tape;
   a slave tape;
   means for transporting said master tape on which information is magnetically recorded;
   means for heating said slave tape to a temperature in the vicinity of the Curie point before contact is made;
   means for bringing said master and slave tapes into contact with each other so as to print said information on said tape onto said slave tape and to maintain said tapes in contact until the slave tape cools substantially below its Curie temperature;
   detecting means mounted between said heating means and said contacting means for detecting the temperature of said heated slave tape;
   tape driving means for said slave tape; and
   means for controlling the temperature of said heated slave tape as a function of the output of said temperature detecting means by controlling the speed of said tape driving means so as to maintain the temperature of said heated slave tape at the temperature in the vicinity of the Curie point.

* * * * *